US009877197B2

(12) United States Patent
Hellam et al.

(10) Patent No.: US 9,877,197 B2
(45) Date of Patent: Jan. 23, 2018

(54) SECURE NETWORK MATCHMAKING (71) Applicant: Disney Enterprises, Inc., Burbank, CA (US)

(72) Inventors: Taylor Hellam, Fresno, CA (US); Justin Patterson, Radnor, PA (US); Fred Agourian, Sunland, CA (US); Mohammad Poswal, Santa Clarita, CA (US); Dario Di Zanni, Valley Village, CA (US)

(73) Assignee: Disney Enterprises, Inc., Burbank, CA (US)

( * ) Notice: Subject to any disclaimer, the term of this patent is extended or adjusted under 35 U.S.C. 154(b) by 348 days.

(21) Appl. No.: 14/879,445

(22) Filed: Oct. 9, 2015

(65) Prior Publication Data
US 2017/0104724 A1   Apr. 13, 2017

(51) Int. Cl.
*H04W 12/08* (2009.01)
*H04L 29/08* (2006.01)
*G06F 3/0482* (2013.01)
*G06F 3/0484* (2013.01)
*H04L 29/12* (2006.01)
*H04L 29/06* (2006.01)
*H04W 84/12* (2009.01)

(52) U.S. Cl.
CPC .......... *H04W 12/08* (2013.01); *G06F 3/0482* (2013.01); *G06F 3/04842* (2013.01); *H04L 61/2007* (2013.01); *H04L 67/141* (2013.01); *H04L 61/10* (2013.01); *H04L 63/102* (2013.01); *H04W 84/12* (2013.01)

(58) Field of Classification Search
CPC ...................................................... H04L 61/10
See application file for complete search history.

(56) References Cited

U.S. PATENT DOCUMENTS

| | | | |
|---|---|---|---|
| 6,118,904 A * | 9/2000 | Detch | H03M 7/4081 341/59 |
| 6,912,652 B2 | 6/2005 | Ito | |
| 6,993,594 B2 | 1/2006 | Schneider | |
| 7,770,112 B2 | 8/2010 | Iwakura | |
| 7,941,834 B2 | 5/2011 | Beck | |
| 8,014,763 B2 | 9/2011 | Hymes | |
| 8,050,241 B2 * | 11/2011 | Abdel-kader | H04W 48/00 370/338 |

(Continued)

FOREIGN PATENT DOCUMENTS

WO   WO.2006062838   6/2006

*Primary Examiner* — Lashonda Jacobs
(74) *Attorney, Agent, or Firm* — Farjami & Farjami LLP (57) ABSTRACT There is provided a method for use by a client device having a client address in a network for communication with a host device having a host address in the network. The method includes retrieving a first subset of a plurality of images, displaying the first subset of the plurality of images, receiving a selection of a second subset of the first subset of the plurality of images from a user of the client device, determining a number based on the second subset of the first subset of the plurality of images, replacing a portion of the client address with the number to obtain the host address, and connecting to the host device using the host address obtained by the replacing of the portion of the client address with the number.

20 Claims, 7 Drawing Sheets

(56) References Cited

U.S. PATENT DOCUMENTS

| | | | |
|---|---|---|---|
| 8,713,141 B1* | 4/2014 | Liu | H04L 63/1425 |
| | | | 709/223 |
| 8,958,559 B2 | 2/2015 | Medina | |
| 2003/0133554 A1 | 7/2003 | Nykanen | |
| 2009/0017765 A1* | 1/2009 | Lev | G06K 9/228 |
| | | | 455/66.1 |
| 2010/0031014 A1 | 2/2010 | Senda | |
| 2011/0187740 A1* | 8/2011 | Jung | G09G 5/00 |
| | | | 345/619 |
| 2014/0172643 A1* | 6/2014 | Fazl Ersi | G06K 9/4642 |
| | | | 705/26.64 |
| 2017/0012775 A1* | 1/2017 | Lafer | H04L 9/12 |

\* cited by examiner

SECURE NETWORK MATCHMAKING

BACKGROUND

Entering an IP (Internet Protocol) address for connecting to a local area wireless network or a WiFi network is a cumbersome and an error prone task. This is especially true when the task of connecting a wireless device to a wireless network needs to be performed by a less computer savvy person. For example, a young child may have a hard time entering an IP address, such as 172.16.254.1, correctly when instructed to do so for connecting the his or her WiFi-enabled device to a WiFi network for joining a group of other children to play a game. Also, if the child makes mistakes in entering the above numbers, the child's WiFi-enabled device may connect to a stranger's WiFi network. In addition, reading the IP address out loud to a child for entering the numbers can reveal the IP address to a stranger who may connect to the WiFi network for malicious purposes. There is therefore a need for systems and methods to easily, safely and securely connect devices via a computer network.

SUMMARY

The present disclosure is directed to systems and methods for secure network matchmaking, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
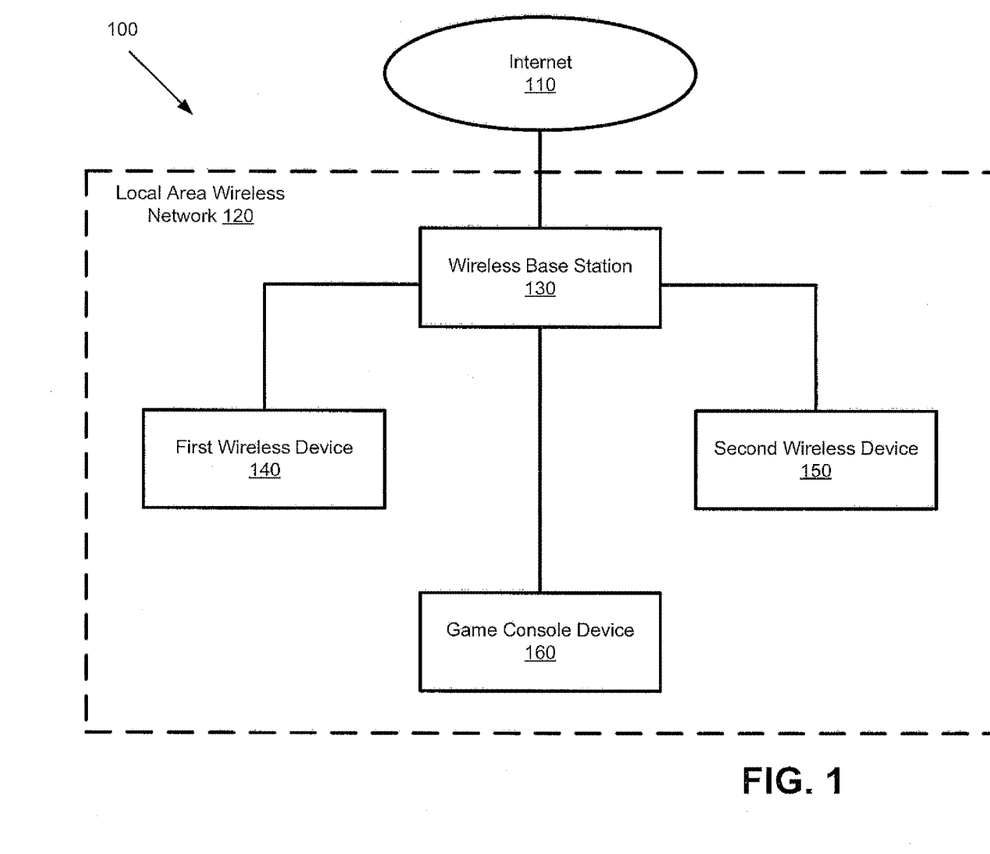
FIG. 1 illustrates an exemplary system including a local area wireless network having a plurality of wireless devices in wireless communication with a wireless base station capable of communicating with a wide area network, according to one implementation of the present disclosure.

FIG. 1 illustrates system 100 including local area wireless network 120 having plurality of wireless devices 140/150/160 in wireless communications with wireless base station 130 capable of communicating with a wide area network, such as Internet 110, according to one implementation of the present disclosure. As shown in FIG. 1, the plurality of wireless devices include first wireless device 140 and second wireless device 150, which may be a wireless phone, a wireless tablet or any other wireless computing device. The plurality of wireless devices may also include game console device 160. The plurality of wireless devices 140/150/160 may communicate with each other and other devices, via Internet 110, through wireless base station 130. Local area wireless network 120 may be a WiFi network established using any of 802.11 standards. Wireless base station 130 is connected to Internet 110 either through a wired connection, such as DSL or cable, or through a wireless connection, such as 3G or Long-Term Evolution (LTE).

Figure 2:
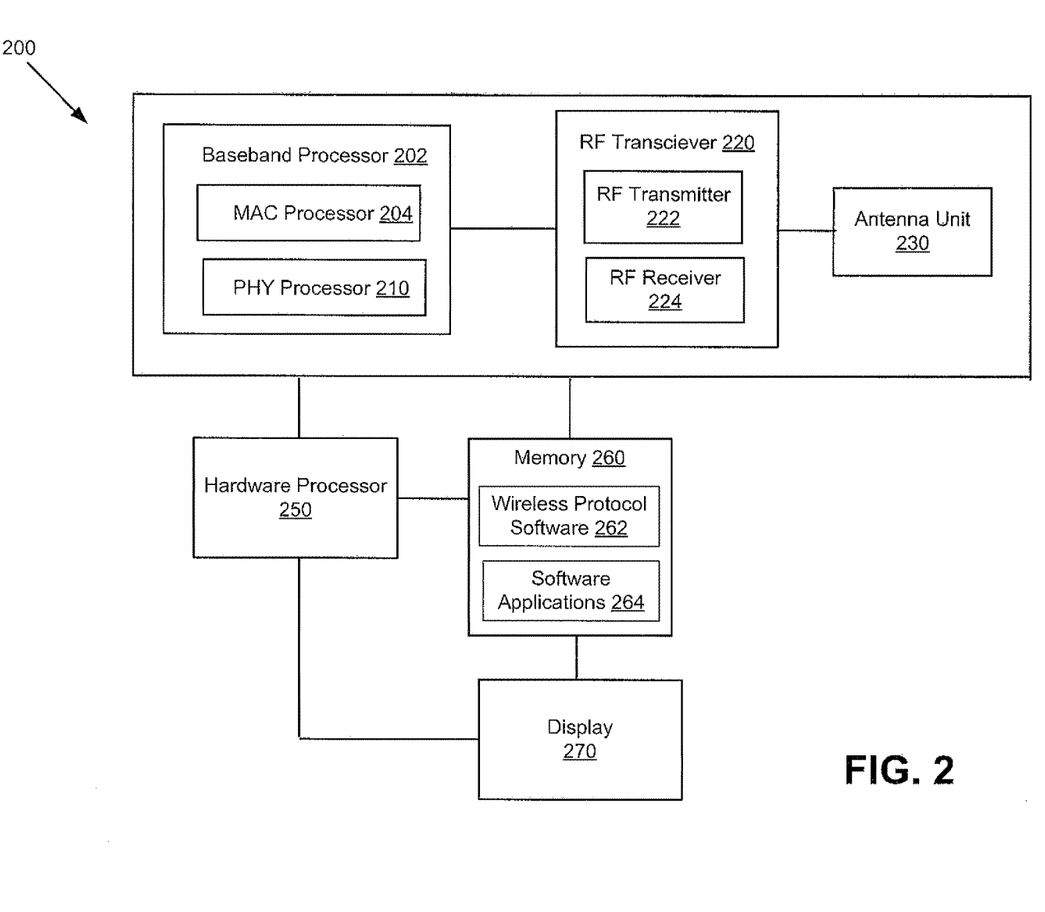
FIG. 2 presents components of an exemplary wireless device for use in the local area wireless network of FIG. 1, according to one implementation of the present disclosure.

FIG. 2 presents components of wireless device 200, which may be one of plurality of wireless devices 140/150/160, for use in local area wireless network 120 of FIG. 1, according to one implementation of the present disclosure. Wireless device 200 may include a medium access control (MAC) layer and a physical (PHY) layer, according to any of the 802.11 standards. As shown in FIG. 2, wireless device 200 includes baseband processor 202, radio frequency (RF) transceiver 220, antenna unit 230, hardware processor 250, memory 260 and display 270.

Baseband processor 202 performs baseband signal processing and includes MAC processor 204 and PHY processor 210. MAC processor 204 may include a MAC software processing unit and a MAC hardware processing unit (not shown). Memory 260 is a computer readable non-transitory storage device and may store software, such as MAC software, such as wireless protocol software 262. Memory 260 may further store an operating system, such as iOS or Android operating systems, and software applications 264 for wireless device 200. MAC processor 204 executes the MAC software to implement various functions of the MAC layer, and the MAC hardware processing unit may implement other functions of the MAC layer in hardware. PHY processor 210 may include a receive (RX) signal processing unit (not shown), which is connected to RF receiver 224, and a transmit (TX) signal processing unit (not shown), which is connected to RF transmitter 222.

The TX signal processing unit typically includes an encoder, an interleaver, a mapper, an inverse Fourier transformer (IFT), and a guard interval (GI) inserter. In operation, the encoder encodes input data, the interleaver interleaves the bits of each stream output from the encoder to change the order of bits, the mapper maps the sequence of bits output from the interleaver to constellation points, the IFT converts a block of the constellation points output from the mapper to a time domain block (i.e., a symbol) by using an inverse discrete Fourier transform (IDFT) or an inverse fast Fourier transform (IFFT), and the GI inserter prepends a GI to the symbol for transmission using RF transmitter 222 of RF transceiver 220.

The RX signal processing unit typically includes a decoder, a deinterleaver, a demapper, a Fourier transformer (FT), and a GI remover. In operation, the GI remover receives symbols from RX receiver 224 of RF transceiver 220. RF receiver 224 and the GI remover may be provided for each receive chain, in addition to one or more other portions of the RX signal processing unit. The FT converts the symbol (i.e., the time domain block into a block of the constellation points by using a discrete Fourier transform (DFT) or a fast Fourier transform (FFT). The demapper demaps the constellation points output from the FT, the deinterleaver deinterleaves the bits of each stream output from the demapper, and the decoder decodes the streams output from the deinterleaver to generate input data for framing.

Hardware processor 250 may be any microprocessor or any circuitry used in a computing device for executing software applications 264, and controlling various components of wireless 200, such as wireless components and display 270. Display 270 may be an LED display, an organic light emitting diode (OLED) display, an LCD display, a plasma display, a cathode ray tube (CRT) display, an electroluminescent display (ELD), or other display appropriate for viewing text, images and videos. Display 270 may be a touch screen displaying for providing input to wireless device 200, which may also use one or more additional input devices, such a keypad, voice, etc.

As discussed above, entering an IP (Internet Protocol) address for connecting to local area wireless network 100, such as a WiFi network, is a cumbersome and an error prone task. This is especially true when the task of connecting a wireless device to a wireless network needs to be performed by a person who may be less experienced with technology, such as a young child. For example, a person may have a hard time entering a 32-bit IP address, such as 130.5.5.25, correctly when instructed to do so for connecting the person's wireless device 140 to local area wireless network 100 for joining another person using wireless device 150 to play a game. The IP address 130.5.5.25 is a 32-bit IP address, as each of the four number blocks separated by a dot is represented by eight binary digits. For example, the IP address 130.5.5.25 may be represented by 10000010.00000101.00000101.00011001. Although the 32-bit IP address is used for describing one implementation of the present disclosure, the present disclosure is not limited to the size of the IP address, and IP addresses of other lengths, such as 128-bit IP address may also be utilized. In addition, although the present disclosure discusses wireless devices and wireless networks, the present disclosure is also applicable to wired devices and wired networks.

In one implementation, software application 264 stored in memory 260 of each wireless device 140 and 150 may include a matchmaking software application for execution by hardware processor 250. Further, memory 260 includes a plurality of images. Each image may be a picture, a letter, a number, a shape, a color or any displayable item that represents a digit without disclosing the digit that the image represents to a user or a viewer.

Figure 3:
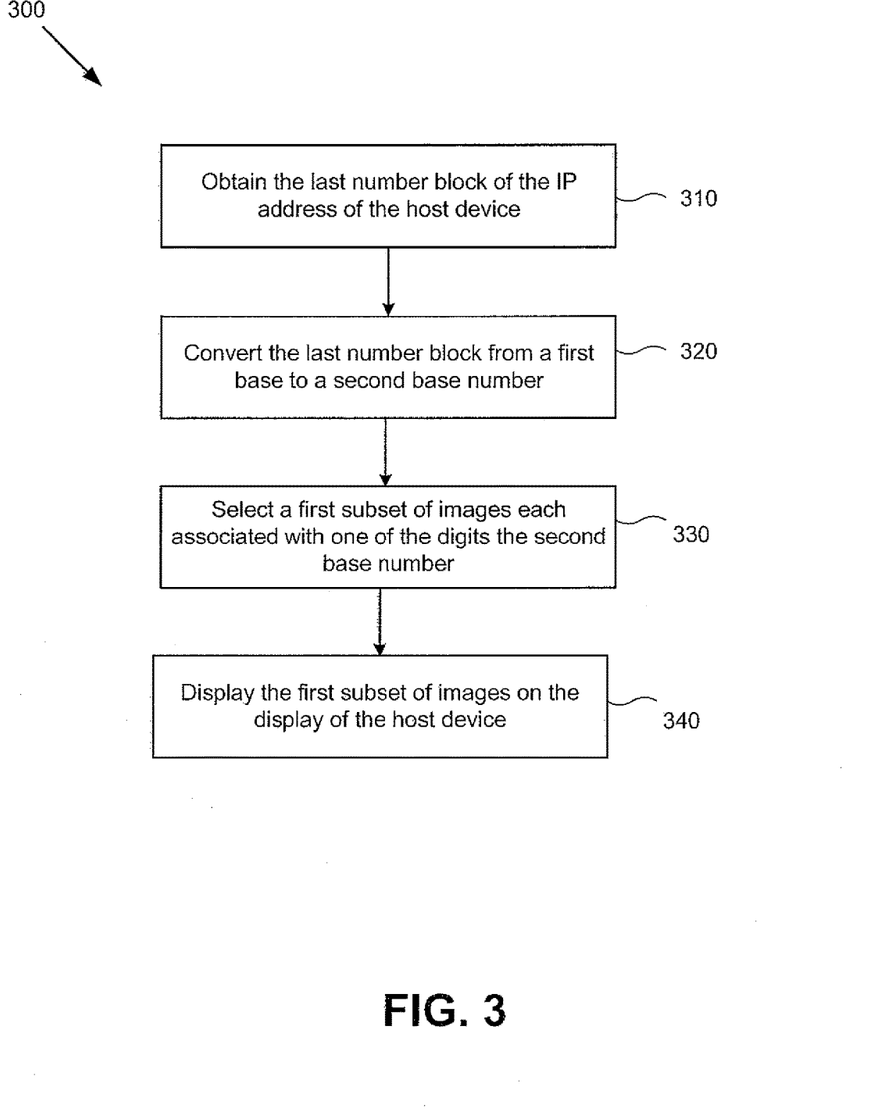
FIG. 3 illustrates an exemplary method for execution by the wireless device of FIG. 1, where the wireless device is a host device, according to one implementation of the present disclosure.

Turning to FIG. 3, FIG. 3 illustrates method 300 for execution by wireless device 140 of FIG. 1, where wireless device 140 is a host device, according to one implementation of the present disclosure. While playing certain games or sharing certain applications, users of wireless device 140 and wireless device 150 may wish to communicate via a local area network, which means that they need to share or use the same IP address. To this end, when a user of wireless device 140 desires to share the IP address of wireless device 140 with a user of wireless device 150, wireless device 140 may launch the matchmaking application stored in the memory of wireless device 140 using hardware processor 250 of wireless device 140. At step 310, the matchmaking application obtains the last number block of the IP address of wireless device 140. For example, if the IP address of wireless device 140 is 130.5.5.25, at step 310, wireless device 140 obtains the base-10 number "25," which may also be represented by eight digits 00011001, as a base-2 number.

Next, at step 320, the matchmaking application converts the last number block of the IP address from a first base to a second base, e.g. from a base-2 or base-10 to a base-7 number, i.e. $x*7^2+y*7^1+z*7^0$. In this case, the base-7 number for "25" is "034." When using base-7, the last number block of the IP address is represented by three digits, and three out of seven images need to be displayed, where each image is associated with one of the digits of the IP address in base-7, i.e. 0-6. In some implementations, conversion of the last number block of the IP address may be to a different base number, or a base number conversion may not occur.

At step, 330, the matchmaking application selects a first subset of images of the plurality of images, e.g. selects three images for base-7, where each selected image is associated with one of the digits of the last number block of the IP address. For example, a first image is associated with "0," a second image is associated with "3," and a third image is associated with "4." Next, at step 340, the matchmaking application displays the first subset of images, e.g. the three images. The first subset of images may be displayed at a pre-defined order or sequence. In one example, the first image may be shown on the left, the second image may be shown in the center, and the third image may be showing on the right.

As stated above, in some implementations, the conversion may be to a base other than base-7, or no conversion may occur at step 320. For example, if there is a conversion to base-6, the last number block may be represented by four digits, and four out of six images need to be displayed, where each image is associated with one of the digits in base-6, i.e. 0-5. As another example, if there is no conversion and base-10 is utilized, the last number block is represented by three digits, and three out of ten images need to be displayed, where each image is associated with one of the digits of the IP address in base-10, i.e. 0-9.

Figure 4:
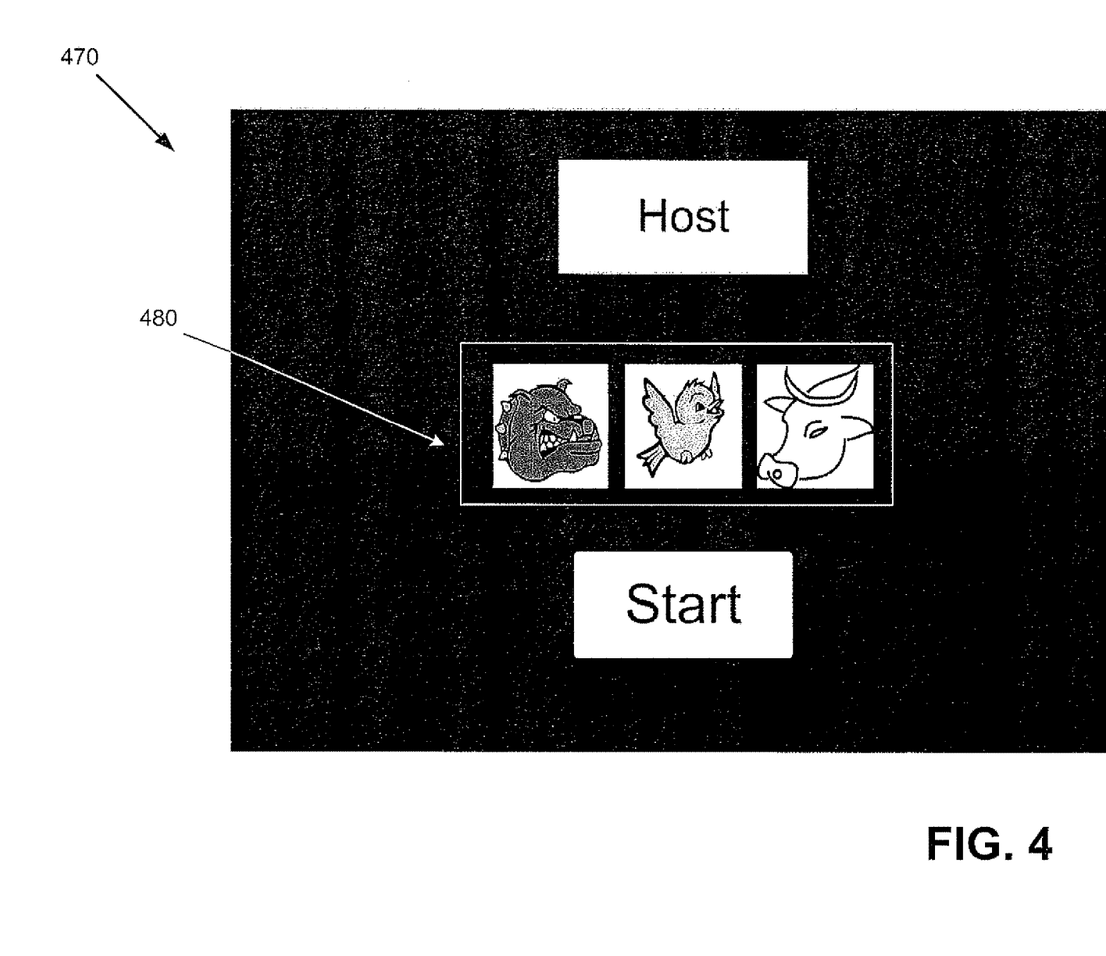
FIG. 4 illustrates exemplary images shown on a display of the host device of FIG. 3, according to one implementation of the present disclosure.

FIG. 4 illustrates exemplary images shown on a display of wireless device 140 or the host device of FIG. 3, according to one implementation of the present disclosure. As shown, a first subset of images 480, e.g. three images, are displayed on display 470 of the host device, where the first image represents "0," the second image represents "3," and the third image represents "4." As such, the user of wireless device 140 (the host device) may either show the images on display 470 to the user of wireless device 150 (the client device), or the user of the host device may tell the user of the client device what those images are, in sequence, e.g. a dog, a bird and a cow.

Figure 5:
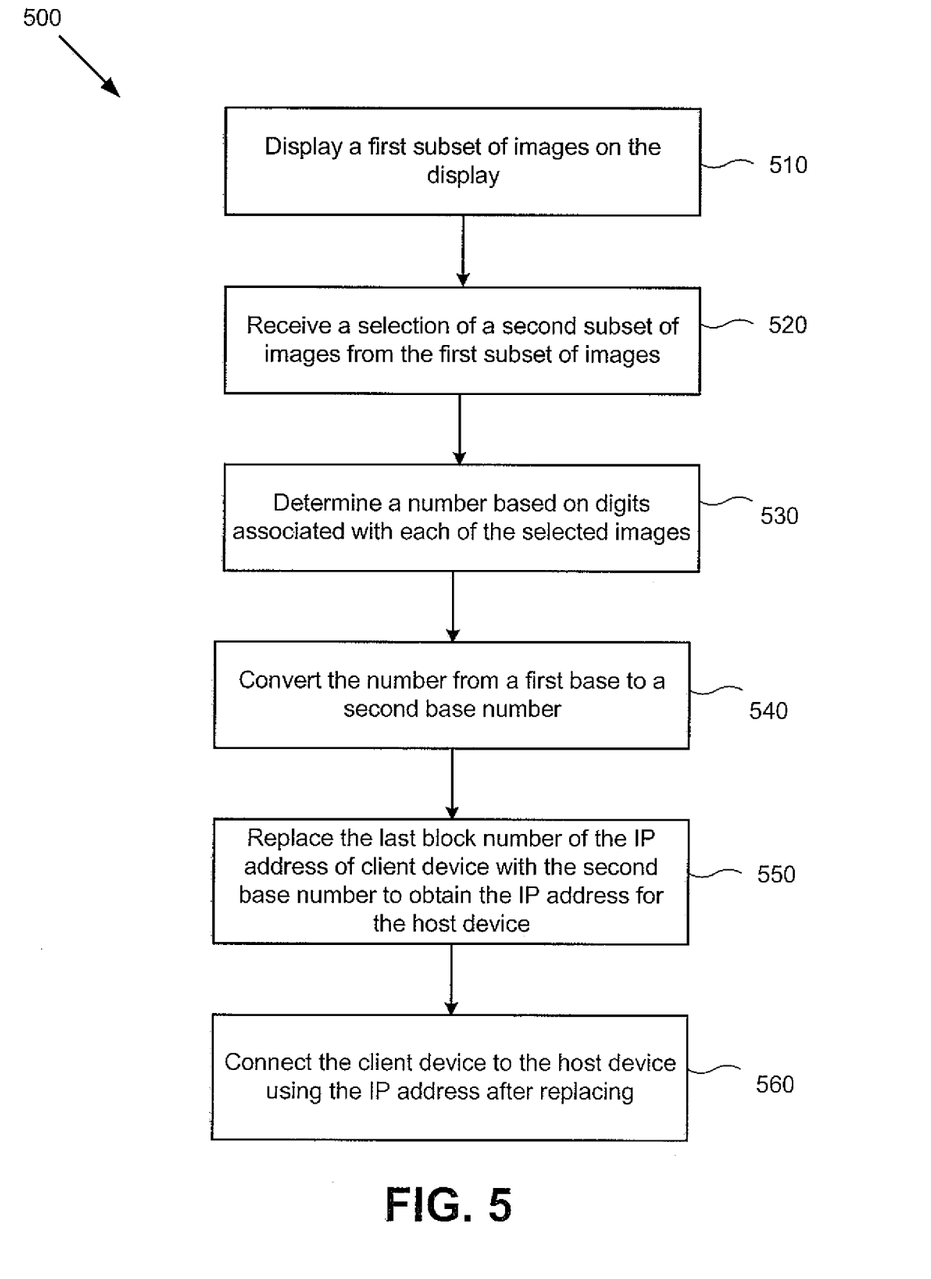
FIG. 5 illustrates an exemplary method for execution by the wireless device of FIG. 1, where the wireless device is a client device, according to one implementation of the present disclosure.

FIG. 5 illustrates method 500 for execution by wireless device 150 of FIG. 1, where wireless device 150 is a client device, according to one implementation of the present disclosure. When a user of wireless device 150 desires to share the IP address of wireless device 140, wireless device 150 may launch the matchmaking application using hardware processor 250 of wireless device 150. At step 510, the matchmaking application displays a first subset of images. The number of images in the first subset depends upon the base number used for representing the last block number of the IP address. For example, at least seven images need to be shown on a display of wireless device 150 if the matchmaking application is operating at base-7 conversion, i.e. at least one image for each possible digit 0-6.

Next, at step 520, the user of wireless device 150 either views the first subset of images shown on the display of wireless device 140 at step 340 or the user of wireless device 140 tells the user of wireless device 150 what those images are in sequence. In any event, at step 520, the user of wireless device 150 selects a second subset of images from the first subset of images, e.g. three of seven images shown on the display of wireless device 150 in the same sequence as they appear on the display of wireless device 140.

Figure 6:
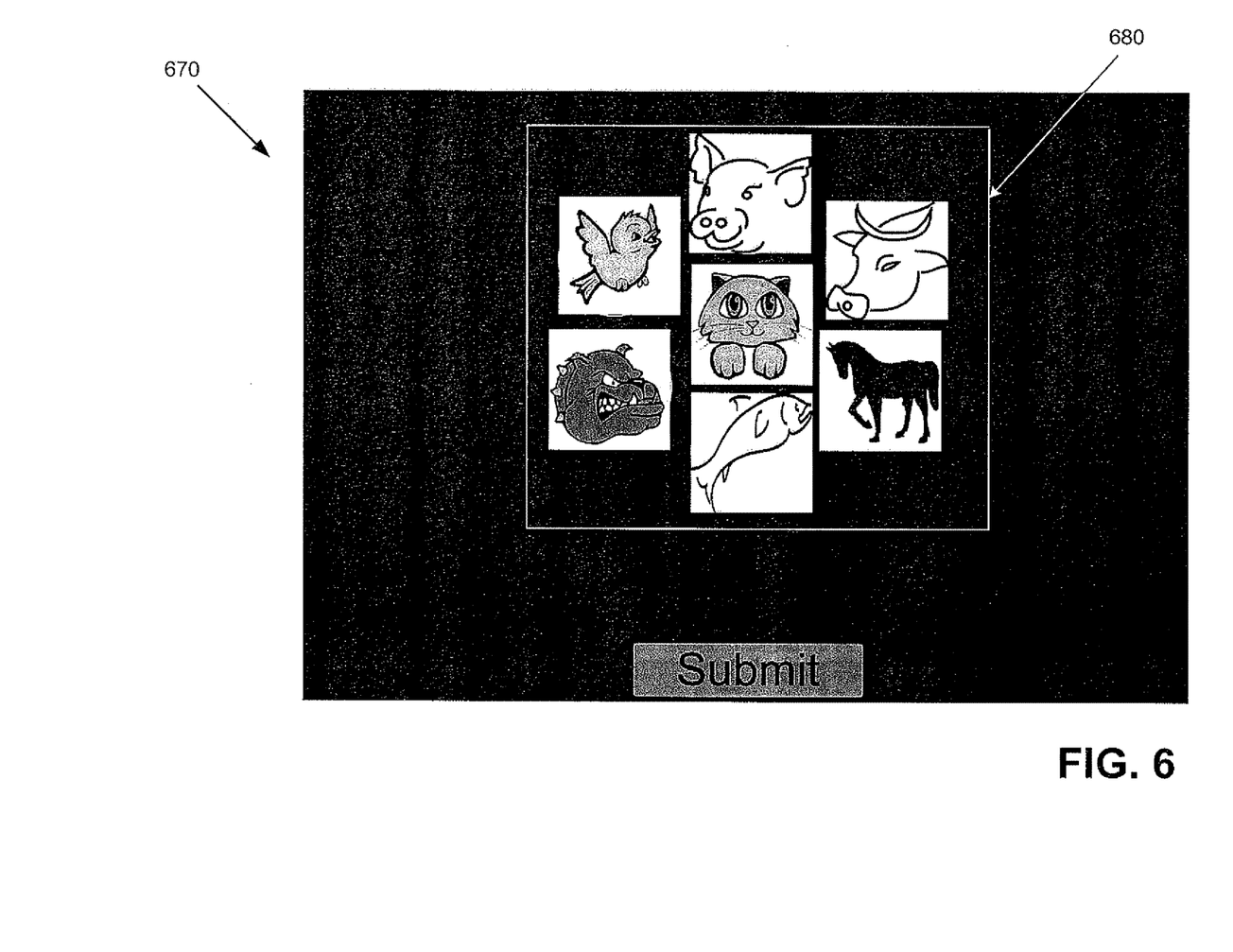
FIG. 6 illustrates exemplary images shown on a display of the client device of FIG. 5, according to one implementation of the present disclosure.
Figure 7:
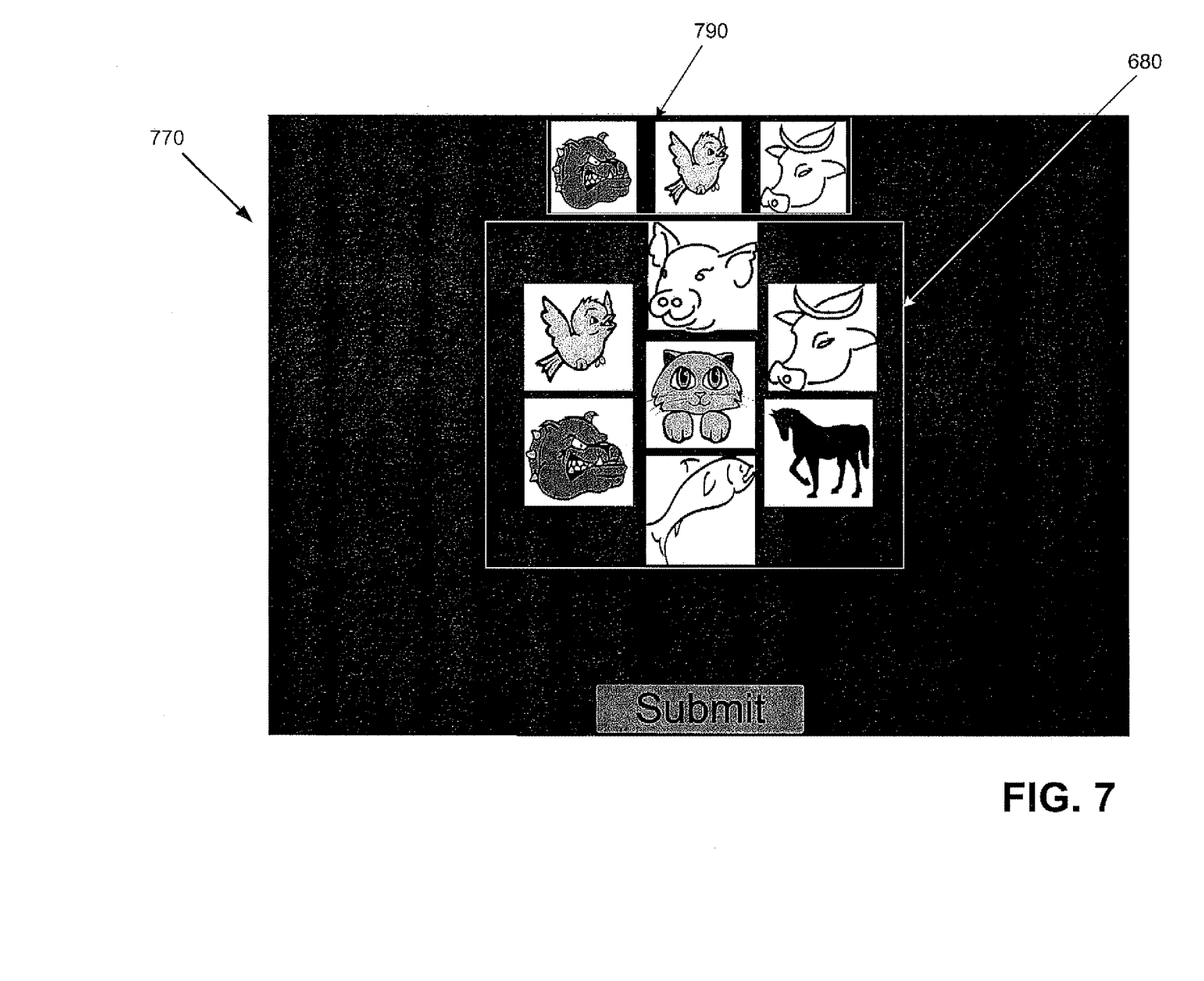
FIG. 7 illustrates exemplary selected images from the images of FIG. 6, according to one implementation of the present disclosure.

FIG. 6 illustrates exemplary images shown on a display of wireless device 150 or the client device of FIG. 4, according to one implementation of the present disclosure. As shown, a first subset of images 680, e.g. seven images, are displayed on display 670 of the client device, where each image represents one of the numbers 0-6. In response to the user of the host device either showing the images on display 470 to the user of wireless device 150 (the client device), or the user of the host device telling the user of the client device what those images are in sequence, e.g. a dog, a bird and a cow, the user of the client device selects those images. FIG. 7 illustrates exemplary selected images from the images of FIG. 6, according to one implementation of the present disclosure. As shown in FIG. 7, a second subset of images 790 from the first subset of images 680 are selected by the user of the client device, which are the dog, the bird and the cow.

Turning to FIG. 5, at step 530, the matchmaking application determines a number, e.g., a base-7 number, based on the selected images. Following the example above, the first selected image represents "0," the second selected image represents "3," and the third selected image represents "4." It should be noted that the sequence of the numbers may not be required to be in the right digit order of "034," as long as the matchmaking application can decode the sequence properly to obtain the last block number of the IP address. For example, the images may indicate "403" in the entered sequence, where the matchmaking application uses a decoding algorithm to derive the last block number of the IP address, such that the last number is selected first, the first number is selected second, and the first number is selected last, i.e. "403" is decoded as "034." In such implementations, the decoding algorithm may be utilized for further security and would have a counterpart encoding algorithm in wireless device 140.

Next, at step 540, the matchmaking application converts the number, e.g. base-7 number to a base-2 or base-10 number. As an example, conversion of "034" to base-10 results in "25." As stated above, in some implementations, a base conversion may not be needed.

In one implementation, the first subset of images may be a combination of pictures, colors, shapes, etc. In another implementation, the first subset of images may even be digits, such as 0-6, however, digit image "0" may represent "6," digit image "1" may represent "3," digit image "2" may represent "0," or any other combination, as long as each possible digit has a representation. As explained above, the matchmaking application must determine the last block number of the IP address based on the selected images or the second subset of images. For example, if the last block number of the IP address is 45 in base-10, based on the representation of digital images above, a selection of digital images "2," "0" and "1," as the second subset of images by the user would result in "063" in base-7, which is $0 \times 7^2 + 6 \times 7^1 + 3 \times 7^0$ "45" in base-10.

At step 550, the matchmaking application obtains the IP address of wireless device 150 and replaces the last block number of the IP address of wireless device 150 with the last block number of the IP address of wireless 140 to obtain the IP address of wireless device 140 or the host device. For example, assuming the IP address of wireless device 150 is 130.5.5.xxx, step 550 replaces xxx with 25, which results in the IP address of wireless 140, i.e. 130.5.5.25. It should be noted that because both wireless device 140 and wireless device 150 are on the same network, the first three block numbers of the 32-bit IP address remain the same. Next, at step 560, wireless device 150 may use the IP address obtained at step 550 to connect to wireless device 140.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a client device having a client address in a network for communication with a host device having a host address in the network, the client device having a hardware processor, a display and a memory storing a plurality of images, the method comprising:
retrieving, using the hardware processor, a first subset of the plurality of images from the memory;
displaying, using the hardware processor, the first subset of the plurality of images on the display;
receiving, using the hardware processor, a selection of a second subset of the first subset of the plurality of images by a user of the client device;
determining, using the hardware processor, a number based on the second subset of the first subset of the plurality of images;
replacing, using the hardware processor, a portion of the client address with the number to obtain the host address; and
connecting, using the hardware processor, to the host device using the host address obtained by the replacing of the portion of the client address with the number.

2. The method of claim 1, wherein the client address is a 32-bit IP address, and wherein the replacing replaces the last eight bits of 32-bit IP address with the number.

3. The method of claim 1, wherein each of the first subset of the plurality of images is associated with a digit, and wherein the determining determines the number based on each digit associated with each selected image of the second subset.

4. The method of claim 3, wherein the determining obtains a first number based on each digit associated with each selected image of the second subset, and converts the first number from a first base to a second base to determine the number.

5. The method of claim 4, wherein the first base is base-7 and the second base is base-10, wherein the first number includes three digits, and wherein the determining converts the first number from base-7 to base-10.

6. The method of claim 5, wherein the first subset includes seven of the plurality of images.

7. The method of claim 6, wherein the second subset includes three of the seven of the plurality of images.

8. A client device having a client address in a network for communication with a host device having a host address in the network, the client device comprising:
- a hardware processor;
- a display; and
- a memory storing a plurality of images and a software application;
- the hardware processor executing the software application to:
  - retrieve a first subset of the plurality of images from the memory,
  - display the first subset of the plurality of images on the display;
  - receive a selection of a second subset of the first subset of the plurality of images by a user of the client device;
  - determine a number based on the second subset of the first subset of the plurality of images;
  - replace a portion of the client address with the number to obtain the host address; and
  - connect to the host device using the host address obtained by the replacing of the portion of the client address with the number.

9. The client device of claim 8, wherein the client address is a 32-bit IP address, and wherein the replacing replaces the last eight bits of 32-bit IP address with the number.

10. The client device of claim 8, wherein each of the first subset of the plurality of images is associated with a digit, and wherein the determining determines the number based on each digit associated with each selected image of the second subset.

11. The client device of claim 10, wherein the determining obtains a first number based on each digit associated with each selected image of the second subset, and converts the first number from a first base to a second base to determine the number.

12. The client device of claim 11, wherein the first base is base-7 and the second base is base-10, wherein the first number includes three digits, and wherein the determining converts the first number from base-7 to base-10.

13. The client device of claim 12, wherein the first subset includes seven of the plurality of images.

14. The client device of claim 13, wherein the second subset includes three of the seven of the plurality of images.

15. A method for use by a host device having a host address in a network for communication with a client device having a client address in the network, the host device having a hardware processor, a display and a memory storing a plurality of images, the method comprising:
- obtaining, using the hardware processor, a number representing a portion of the host address;
- retrieving, using the hardware processor, a first subset of the plurality of images from the memory, wherein the first subset of the plurality of images represent the number; and
- displaying, using the hardware processor, the first subset of the plurality of images on the display.

16. The method of claim 15, wherein the host address is a 32-bit IP address, and wherein the number is the last eight bits of 32-bit IP address.

17. The method of claim 15, wherein each of the first subset of the plurality of images is associated with a digit forming the number.

18. The method of claim 17 further comprising:
- converting a first number representing the portion of the host address from a first base to a second base to obtain the number.

19. The method of claim 18, wherein the first base is base-10 and the second base is base-7.

20. The method of claim 19, wherein the first subset includes three of the plurality of images.

* * * * *